United States Patent
Sukhomlinov et al.

(10) Patent No.: US 12,395,344 B2
(45) Date of Patent: *Aug. 19, 2025

(54) METHOD AND SYSTEM FOR AUTHENTICATING A SECURE CREDENTIAL TRANSFER TO A DEVICE

(71) Applicant: Google LLC, Mountain View, CA (US)

(72) Inventors: Vadim Sukhomlinov, Santa Clara, CA (US); Alberto Martin, Los Altos, CA (US); Andrey Pronin, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/738,179

(22) Filed: Jun. 10, 2024

(65) Prior Publication Data
US 2024/0333514 A1 Oct. 3, 2024

Related U.S. Application Data

(63) Continuation of application No. 18/080,084, filed on Dec. 13, 2022, now Pat. No. 12,041,174, which is a (Continued)

(51) Int. Cl.
*H04L 9/32* (2006.01)
(52) U.S. Cl.
CPC .......... *H04L 9/3234* (2013.01); *H04L 9/3213* (2013.01); *H04L 9/3263* (2013.01)
(58) Field of Classification Search
CPC ... H04L 9/3234; H04L 9/3213; H04L 9/3263; H04L 2209/805; H04L 9/0897;
(Continued)

(56) References Cited

U.S. PATENT DOCUMENTS 8,078,873 B2   12/2011  Shah
9,918,226 B2 *  3/2018  Khan ................... G06Q 20/322
(Continued)

FOREIGN PATENT DOCUMENTS

JP   2008537370 A   9/2008
JP   2010505334 A   2/2010
(Continued)

OTHER PUBLICATIONS

Office Action issued in corresponding Japanese Patent Application No. 2023-117262, mailed Jul. 9, 2024, 4 pages.
(Continued)

*Primary Examiner* — Sanchit K Sarker
(74) *Attorney, Agent, or Firm* — Botos Churchill IP Law LLP

(57) ABSTRACT

A method for authenticating a secure credential transfer to a device includes verifying user identity and device identity. In particular, the method includes verifying user identity by requesting and receiving a user identification input at a first client device and verifying device identity of a second client device by (i) determining a security status of the second client device from hardware of the second client device, (ii) invoking an identifier related to the security status of the second client device to an authentication server, and (iii) obtaining certification from the authentication server for the second client device based on the invoked identifier. After verifying the user identity and the device identity, the method includes establishing a secure channel between the first client device and the second client device for the secure credential transfer using one or more tokens generated by the authentication server.

23 Claims, 5 Drawing Sheets

Related U.S. Application Data continuation of application No. 16/526,384, filed on Jul. 30, 2019, now Pat. No. 11,552,798.

(58) Field of Classification Search
CPC . H04L 9/3273; H04L 63/102; H04L 63/0853; H04L 63/0876; H04L 63/0428; H04L 63/0807; H04W 12/084; H04W 12/50; H04W 4/80; H04W 12/06; G06F 21/31; G06F 21/575
USPC .......................................................... 713/185
See application file for complete search history.

(56) References Cited

U.S. PATENT DOCUMENTS

| | | |
|---|---|---|
| 10,123,189 B2 | 11/2018 | Chan |
| 2004/0098484 A1 | 5/2004 | Wuebker |
| 2006/0196931 A1 | 9/2006 | Holtmanns et al. |
| 2006/0294366 A1 | 12/2006 | Nadalin et al. |
| 2007/0198413 A1 | 8/2007 | Nagao |
| 2012/0128154 A1 | 5/2012 | Ran |
| 2013/0073463 A1 | 3/2013 | Dimmick et al. |
| 2015/0262170 A1 | 9/2015 | Bouda |
| 2015/0379506 A1 | 12/2015 | Griffin |
| 2016/0078434 A1 | 3/2016 | Huxham et al. |
| 2016/0164883 A1 | 6/2016 | Li et al. |
| 2016/0286391 A1 | 9/2016 | Khan |
| 2016/0344716 A1 | 11/2016 | Mantha |
| 2017/0070486 A1* | 3/2017 | Lyons ................... H04L 63/061 |
| 2018/0005465 A1 | 1/2018 | Truong et al. |
| 2018/0108009 A1 | 4/2018 | Bak et al. |
| 2019/0033975 A1* | 1/2019 | Horowitz ................... G06T 7/20 |
| 2019/0097812 A1 | 3/2019 | Toth |
| 2019/0149514 A1 | 5/2019 | Jawahar |
| 2019/0182044 A1 | 6/2019 | Mullen et al. |
| 2019/0370781 A1* | 12/2019 | Van Os ................... G06F 21/31 |
| 2019/0370805 A1 | 12/2019 | Van Os et al. |
| 2020/0074114 A1 | 3/2020 | Cheng et al. |
| 2020/0175154 A1* | 6/2020 | Ratnakaram ............ G06F 21/54 |
| 2021/0019285 A1 | 1/2021 | Athlur et al. |

FOREIGN PATENT DOCUMENTS

| | | |
|---|---|---|
| JP | 2014238664 A | 12/2014 |
| KR | 20190036504 A | 4/2019 |
| WO | 2016178082 A1 | 11/2016 |

OTHER PUBLICATIONS

Christopher Hackings "Two-Factor Authentication Using Tivoli Access Manager WebSEAL", IBM Corporation, ibm.com/developerWorks/ (Year: 2005).

International Search Report and Written Opinion for Application No. PCT/US2020/043042 dated Oct. 20, 2020.

Notice of Allowance for Republic of Korea Patent Application No. 10-2022-7001997, May 29, 2024, 5 Pages.

Notice of Grounds of Rejection for Japanese Patent Application No. 2022-506248, Mar. 7, 2023.

Samsung, "Tap & Go Device Setup," https://www.samsung.com/us/switch-me/switch-to-the-galaxy-s-5/app/partial/setup-device/tap-go.html (last access May 3, 2018).

The First Examination Report for India Patent Application No. 202147059320, Mar. 5, 2024, 8 Pages.

* cited by examiner

METHOD AND SYSTEM FOR AUTHENTICATING A SECURE CREDENTIAL TRANSFER TO A DEVICE

CROSS REFERENCE TO RELATED APPLICATIONS

The present application is a continuation of U.S. patent application Ser. No. 18/080,084, filed Dec. 13, 2022, which is a continuation of U.S. patent application Ser. No. 16/526,384, filed Jul. 30, 2019, issued as U.S. Pat. No. 11,552,798, the entire disclosures of which are incorporated herein by reference.

BACKGROUND

When setting up a new device, a user will have to login to a system anew, such as by providing a password, use two-factor authentication, or other means. This login process may include additional steps, such as accessing a password lookup system. Prior to logging in, the user may not fully explore the new device and determine whether the new device fits their needs or whether the new device is a secure device for work or other uses.

BRIEF SUMMARY

Aspects of the disclosure provide for a method for authenticating a secure credential transfer to a device. The method includes receiving, by one or more first processors at a first client device, user input to initiate the secure credential transfer to a second device, the user input triggering a communication to be sent to a second client device; verifying user identity by requesting, by the one or more first processors, a user identification input and receiving, by the one or more first processors, the user identification input; verifying device identity of the second client device by determining, by one or more second processors of the second client device, a security status of the second client device from hardware of the second client device, invoking, by the one or more second processors, an identifier related to the security status of the second client device to an authentication server, and receiving, by the one or more second processors, certification from the authentication server for the second client device based on the invoked identifier; receiving, by the one or more second processors, one or more tokens associated with an account for the secure credential transfer; and after verifying the user identity and the device identity, establishing, using the one or more first processors and the one or more second processors, a secure channel between the first client device and the second client device for the secure credential transfer using the one or more tokens.

In one example, the user input to initiate the secure credential transfer to a second device includes a tap input in an applet installed on the first client device. In another example, the communication is sent from the first client device to the second client device using near field communication. In this example, the method optionally includes, after the one or more second processors of the second client device receives the communication, requesting, by the one or more second processors, user confirmation of the secure credential transfer to the second device.

In a further example, the user identification input is an existing verification of user identity for the first client device. In yet another example, the security status of the second client device is determined from a trusted security chip of the second client device. In a still further example, the certification from the authentication server indicates that the invoked identifier is associated with a known client device in a database of the authentication server.

In another example, the method also includes receiving, by the one or more first processors, the certification for the second client device. In a further example, the method also includes receiving, by the one or more first processors, a selection of the account for the secure credential transfer. In yet another example, invoking the identifier related to the security status of the second client device to the authentication server includes using the first client device as a proxy for invoking the identifier to the authentication server.

Other aspects of the disclosure provide for a non-transitory, computer-readable medium configured to store instructions executable by one or more processors. The instructions, when executed, cause the one or more processors to perform a method. The method includes receiving, at a first client device, user input to initiate a secure credential transfer to a second device, the user input triggering a communication to be sent to a second client device; verifying, at the first client device, user identity by requesting a user identification input and receiving the user identification input; verifying device identity of the second client device by determining, at the second client device, a security status of the second client device from hardware of the second client device, invoking, from the second client device, an identifier related to the security status of the second client device to an authentication server, and receiving, at the second client device, certification from the authentication server for the second client device based on the invoking identifier; receiving, from the authentication server, one or more tokens associated with an account for the secure credential transfer; and after verifying the user identity and the device identity, establishing a secure channel between the first client device and the second client device for the secure credential transfer using the one or more tokens.

In one example, the user input to initiate the secure credential transfer to the second device includes a tap input in an applet installed on the first client device. In another example, the communication is sent from the first client device to the second client device using near field communication. In a further example, the security status of the second client device is determined from a trusted security chip of the second client device. In yet another example, the certification from the authentication server indicates that the invoked identifier is associated with a known client device in a database of the authentication server.

In a still further example, the method also includes receiving, at the first client device, the certification for the second client device. In another example, the method also includes receiving, at the first client device, a selection of the account for the secure credential transfer. In a further example, invoking the identifier related to the security status of the second client device to the authentication server includes using the first client device as a proxy for invoking the identifier to the authentication server.

Further aspects of the disclosure provide for a system. The system includes a memory storing a database of device identity information for a plurality of devices that have a verified security status; and one or more processors in communication with the memory. The one or more processors being configured to receive a communication from a first computing device related to initiating a secure credential transfer; receive a validation request from a second computing device, the validation request including a challenge communication carrying information related to a user identity verification, a first identifier from a previous challenge communication, and a signature from the second computing device including a second identifier related to a security status of the second computing device; perform a verification of the validation request including verifying that the information related to the user identity verification is from the first computing device, verifying that the first identifier matches the second identifier, and verifying that the second identifier matches a device in the database of device identity information; and provide one or more tokens to the first computing device and the second computing device to establish a secure channel for the secure credential transfer to the second computing device.

In one example, the one or more processors are configured to provide the one or more tokens by providing a first token to the second computing device including a certification for the validation request; receiving a selection of a user account from the first computing device; providing a second token for the user account to the first computing device; receiving a signed second token from the second computing device; and providing a third token for establishing a secure channel for the secure credential transfer to the second computing device.

DETAILED DESCRIPTION

Overview

Figure 1:
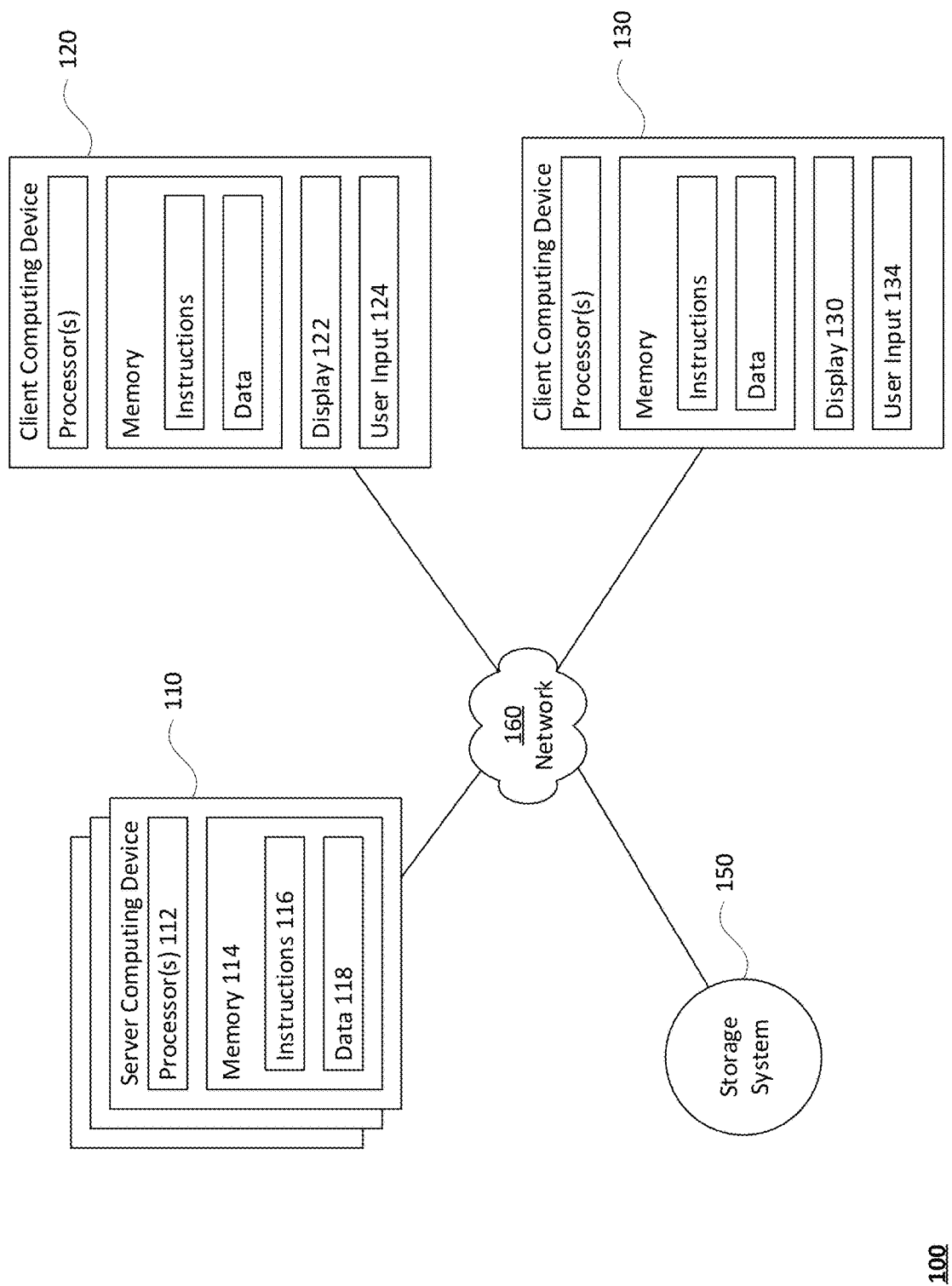
FIG. 1 is a functional diagram of an example system 100 in accordance with aspects of the disclosure.

The technology relates to a method and system for authenticating a secure credential transfer to a device. When a user is using a new or loaner device, credentials are typically required for the user profile and other settings to be transferred to the device. Commonly, some combination of passwords, two-factor authentication, and other verification schemes are implemented. However, one problem in these methods is that they do not typically include an integrated way to also verify that the device is a secure device. The method and system described herein provides a series of steps that allows for verification of the user as well as the device prior to the credential transfer. In addition, the method and system described herein require less user interaction than other authentication methods and systems, allowing for a simpler process for the user. Moreover, the approach described herein can improve the security of a user profile and other settings by reducing the need for credentials to be manually entered on a new or loaner device, and/or by allowing for temporary transfer/authentication of credentials.

The system for authentication includes a first client device, and second client device, and an authentication server. A user may have a user profile on or accessible from the first client device. The user profile may include device settings, application downloads, application settings, or account settings. The second client device may be any device that does not have the user profile store on it or accessible from it. The authentication server may have a database of device identity information for a plurality of devices whose security is known or otherwise verified.

To initiate a secure credential transfer of a user profile, user input may be received at the first client device, then and the second client device to confirm the transfer from the first client device to the second client device. In response to the confirmation, the second client device may send an identifier of the second client device to the first client device. The identifier may include a security status retrieved from hardware of the second client device, which indicates that the second client device is a trusted device for purposes of the transfer. User identity verification may be performed at the first client device to further confirm the request for secure credential transfer to the second client device after receiving the user confirmation at the second client device. In addition, device identity verification may be performed for the second client device by transmitting a signature of the second client device to the authentication server for verification. If the second client device is verified, the authentication server may provide a certification of the second client device and a transfer token to the second client device. The certification and the transfer token may be transmitted from the second client device to the first client device, which may perform an additional check of the certification of the second client device.

User input may be received at the first client device to select an account, such as the user profile, and a validity time for the secure credential transfer. The first client device may then request a temporary token for the selected account from the authentication server. In response, the authentication server may transmit the temporary token to the first client device, which transmits the temporary token to the second client device. The second client device may sign the temporary token and transmit the signed temporary token to the authentication server to verify a channel between the first client device and the second client device. When the information related to the signed temporary token is verified, the authentication server then provides a regular session token that has the requested validity time for the secure credential transfer to the second client device. The secure credential transfer of the user profile from the first client device to the second client device is then completed using the regular session token. Namely, the second client device is authenticated by the first client device for access to the user profile during the validity time The features described above have a technical effect of providing a more secure process to authorize access to user credentials on a client device. By using a client device that is already trusted by a user to authenticate a second client device, the process has a technical benefit that requires less complicated user input and may improve security by removing the need for user credentials to be entered manually on an unknown device. Rather than requiring user input of login information and additional user verification steps, the authentication method requires user request of the transfer of a particular account and authentication at the trusted device. Also, because the process verifies the second device as a trustworthy device using an authentication server, the user may have greater confidence in the security of transferring or accessing the user credentials to the second device. Security may also be improved by the process of mutual identity verification of both the first and second client devices prior to any transfer of user credentials.

Example Systems

Figure 2:
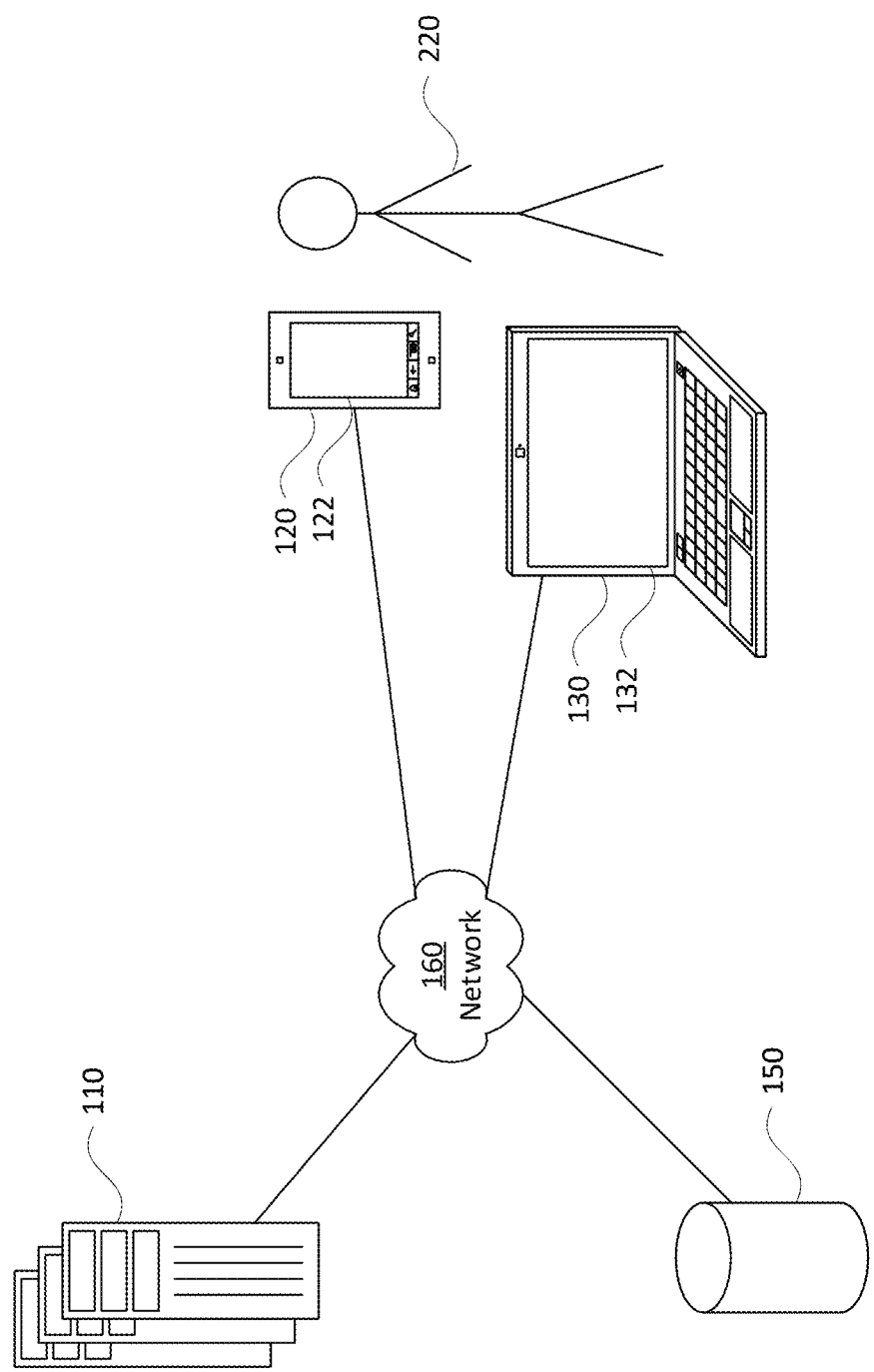
FIG. 2 is a pictorial diagram of the example system 100 in accordance with aspects of the disclosure.

FIGS. 1 and 2 show an example system 100 in which the features described herein may be implemented. The example system may be a system for authenticating a client computing device. In this example, the system 100 may include a plurality of computing devices 110, 120, 130 and a storage system 150 connected via a network 160. Computing device 110 may be a server computing device operating as an authentication server. Computing devices 120 and 130 may be client computing devices.

As shown in FIG. 1, authentication server 110 includes one or more processors 112, memory 114, instructions 116 and data 118. The one or more processor 112 may be any conventional processor, such as commercially available CPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be located or stored within the same physical housing. In one example, one or more computing devices 110 may include one or more server computing devices having a plurality of computing devices, e.g., a load balanced server farm, that exchange information with different nodes of a network for the purpose of receiving, processing and transmitting the data to and from other computing devices.

The memory 114 stores information accessible by the one or more processors 112, including instructions 116 and data 118 that may be executed or otherwise used by the processor(s) 112. The memory 114 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media. In particular, the memory 114 may be configured to store a database of device identity information for a plurality of computing devices.

The instructions 116 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Processes, functions, methods and routines of the instructions are explained in more detail below. In addition, the instructions 116 may include compiling and updating the database of device identify information of devices that are known or verified to be secure devices.

The data 118 may be retrieved, stored or modified by processor 112 in accordance with the instructions 116. As an example, data 118 associated with memory 114 may comprise the database of device identity information for a plurality of computing devices. In addition, data 118 may also include data used in supporting services for one or more client devices, e.g., 120, 130 or more. Such data may include data to support hosting web-based applications, file share services, communication services, gaming, sharing video or audio files, or any other networked based services.

Each of the client computing devices 120 and 130 may be configured similarly to the authentication server 110, with one or more processors, memory, instructions, and data as described above. Each client computing device 120, 130 may be a personal computing device intended for use by a user. As shown in FIG. 2, both client computing devices 120 and 130 may be intended for use by a single user 220. In some alternative examples, the authentication server 110 may be part of the client computing device 120 or 130 rather than be remote from the client computing device 120 or 130.

In addition, each client computing device 120, 130 have all of the components normally used in connection with a personal computing device including a one or more processors (e.g., a central processing unit (CPU)), memory (e.g., RAM and internal hard drives) storing data and instructions, a display such as displays 122, 132 (e.g., a monitor having a screen, a touch-screen, a projector, a television, or other device that is operable to display information), speakers, and user input devices 124, 134 (e.g., a mouse, keyboard, touchscreen, camera, or microphone). The one or more processors of each client computing device may be same or similar to the one or more processors 112, and the memory of each client computing device storing instructions and data may be same or similar to the memory 114 storing instructions 116 and data 118. In addition, each client computing device may include one or more components that enable near field communication (NFC) capabilities.

Although the client computing devices 120, 130 may each comprise a full-sized personal computing device, they may alternatively comprise mobile computing devices capable of wirelessly exchanging data with a server computing device (such as the server computing devices 110) over a network such as the Internet. By way of example only, client computing device 120 may be a mobile phone or a device such as a wireless-enabled PDA, a tablet PC, a wearable computing device or system, or a netbook that is capable of obtaining information via the Internet or other networks. In another example, client computing device 120 may be a wearable computing system, such as a smartwatch.

At the client computing device 120, a user profile for a user, such as user 220, may be on or accessible. The user profile may include device settings, application downloads, application settings, or account settings. The client computing device 130 may not have the user profile stored on it or accessible from it. For example, the client computing device 130 may be a newly purchased laptop or a loaner laptop, or a display laptop in a retail environment.

As with memory 114, storage system 150 can be of any type of computerized storage capable of storing information accessible by the server computing devices 110, such as a hard-drive, memory card, ROM, RAM, DVD, CD-ROM, write-capable, and read-only memories. In addition, storage system 150 may include a distributed storage system where data is stored on a plurality of different storage devices which may be physically located at the same or different geographic locations. Storage system 150 may be connected to the computing devices via the network 160 as shown, and/or may be directly connected to or incorporated into any of the computing devices 110, 120, 130, etc. Storage system 150 may store various types of information that may be retrieved or otherwise accessed by one or more server computing devices, such as the authentication server 110, and/or one or more client computing device, such as the client computing device 120 or 130, in order to perform some or all of the features described herein.

Although FIG. 1 functionally illustrates the processor, memory, and other elements of the computing devices as being within the same block, the processor, computer, computing device, or memory can actually comprise multiple processors, computers, computing devices, or memories that may or may not be stored within the same physical housing. For example, the memory 114 can be a hard drive or other storage media located in housings different from that of the computing device 110.

References to a processor, computer, computing device, or memory will be understood to include references to a collection of processors, computers, computing devices, or memories that may or may not operate in parallel. For instance, the computing device 110 may include server computing devices operating as a load-balanced server farm, distributed system, etc. Yet further, although some functions described below are indicated as taking place on a single computing device having a single processor, various aspects of the subject matter described herein can be implemented by a plurality of computing devices, for example, communicating information over network 160.

The network 160, and intervening nodes, may include various configurations and protocols including short range communication protocols such as Bluetooth™, Bluetooth™ LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

Example Methods

Figure 3:
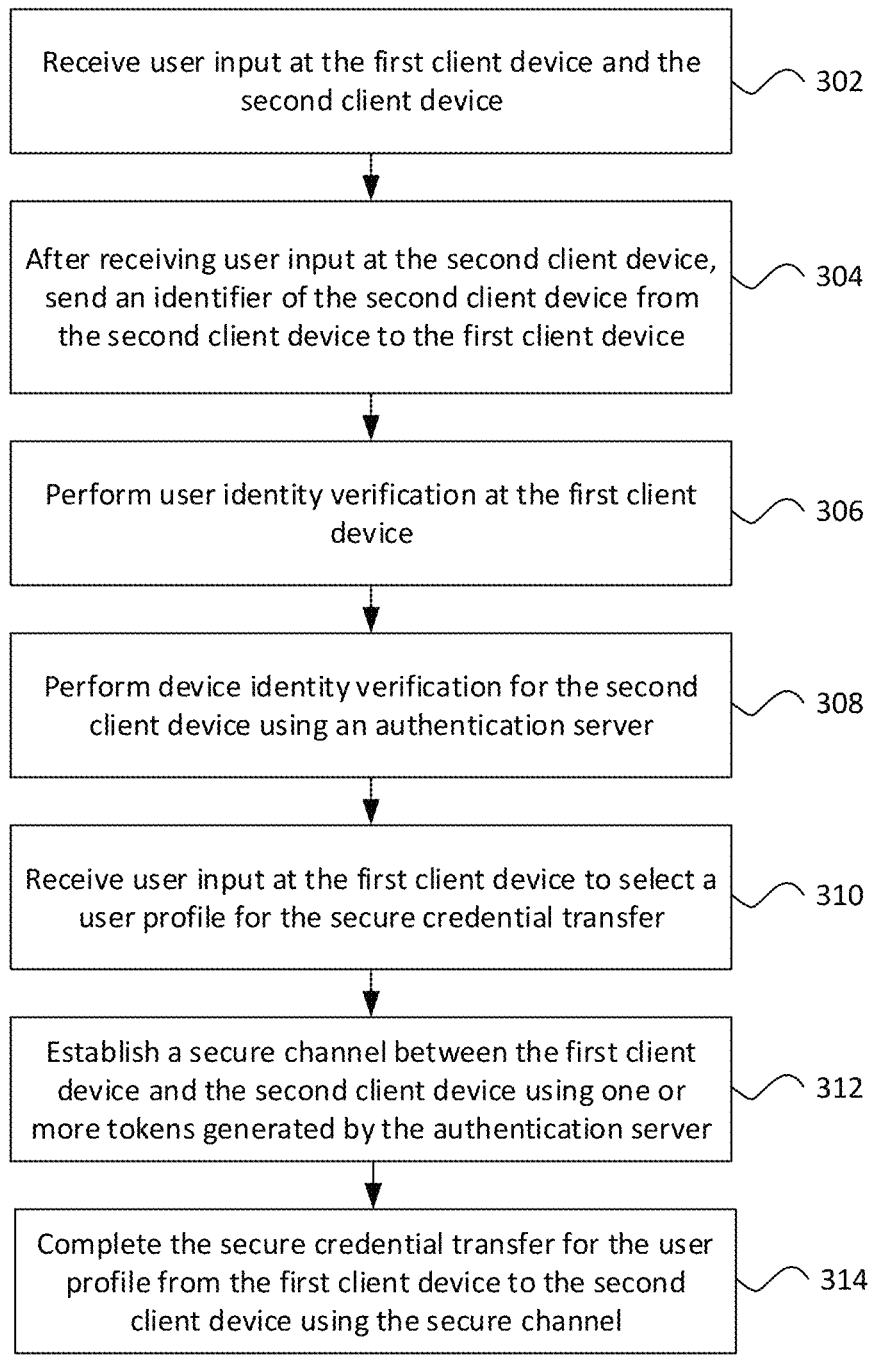
FIG. 3 is a flow diagram 300 of an example method in accordance with aspects of the disclosure.
Figure 4:
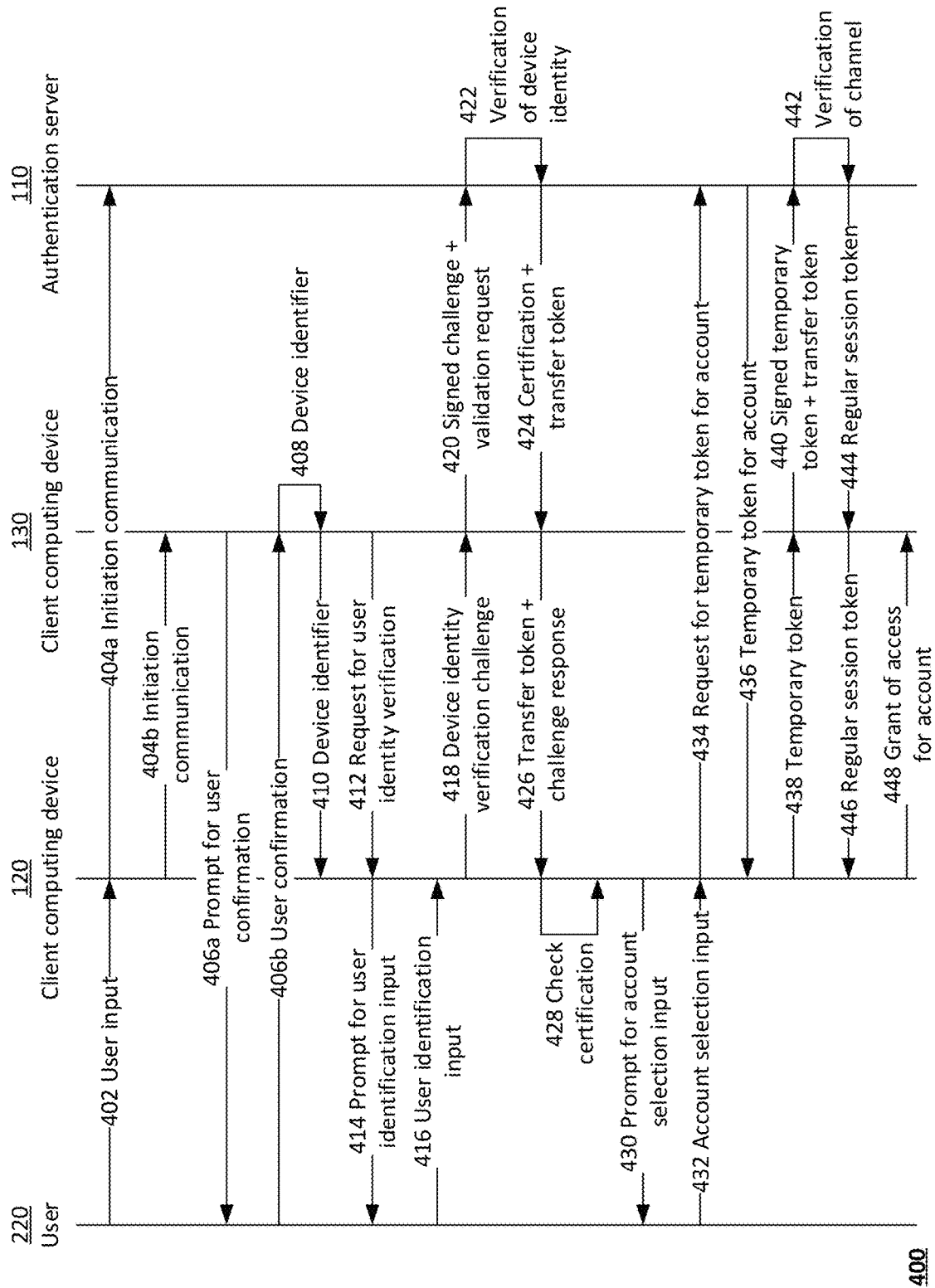
FIG. 4 is a detailed diagram 400 of an example method in accordance with aspects of the disclosure.

In addition to the operations described above and illustrated in the figures, various operations will now be described. It should be understood that the following operations do not have to be performed in the precise order described below. Rather, various operations can be handled in a different order or simultaneously, and operations may also be added or omitted. For instance, FIG. 3 is a flow diagram 300 in accordance with aspects of the disclosure. More specifically, FIG. 3 shows a flow of an example method for authenticating a secure credential transfer from the client computing device 120, hereinafter "a first client device," to the client computing device 130, herein after "a second client device" using the authentication server 110. The first client device 120 and second client device 130 may have NFC enabled. In addition, FIG. 4 shows a functional diagram 400 showing additional details to the method shown in FIG. 3, including communications between the first client device 120, the second client device 130, and the authentication server 110.

At block 302, to initiate a secure credential transfer of a user profile, user input may be received at the first client device 120 and the second client device 130. For example, as shown in FIG. 4, at step 402, the user input may be received at the first client device 120 to initiate the process of authenticating the second client device 130. The user input may be a tap received at the user input device 124 of the first client device in an applet installed on the first client device or in a browser open on the first client device. In some cases, the user input may provide an indication of an account for the secure credential transfer. The user input may trigger transmission of a first communication from the first client device to the authentication server at step 404a. The first communication may include information related to the first client device, initiating the secure credential transfer, and/or the account for transfer. The user input may also trigger a transmission of a second communication using NFC at step 404b. The second communication may include instructions for initiating the secure credential transfer on the second client device. The second client device may detect the communication from the first client device and, at step 406a, prompt the user for confirmation of the transfer on the second client device. The prompt may include opening a browser (or other application) on the second client device and requesting user input in the browser. At step 406b, user confirmation may be received at the second client device via the user input at the second client device.

At block 304, in response to the user confirmation, the second client device may send an identifier of the second client device to the first client device. As shown at step 408 in FIG. 4, the identifier may be retrieved from hardware of the second client device, such as a trusted security chip. In addition, the identifier may also include a security status, which also may be retrieved from the hardware of the second client device. In particular, the security status of the second client device may indicate that the second client device is prepared for the secure credential transfer. For example, the security status may be that the second client device is in a "verified boot mode." The security status for verified boot mode may indicate that the platform firmware and/or operating system of the second client device is authenticated to be from a known and trusted source. In one example, the security status for verified boot mode may indicate that all executed code on the second client device has been verified as coming from a known and trusted source tree. As shown at step 410, after retrieving the identifier for the second client device, the identifier may be transmitted to the first client device 120, such as via NFC.

At block 306, user identity verification may be performed at the first client device to confirm the request for secure credential transfer to the second client device. As shown in step 412 of FIG. 4, the user identity verification may be requested after receiving the user confirmation at the second client device. The request for user identity verification may be transmitted from the second client device as a challenge communication using NFC. In response to receiving the request, the first client device may provide a prompt for user identification input at step 414. The prompt may be provided on the display 122 of the first client device. This can facilitate a two-way verification process, which has the technical advantage of improving security of the credential transfer. The user identification input may be an existing verification process on the first client device. For example, a user identification input that would unlock the first client device may be used, such as a password, thumbprint verification, or facial recognition. Once the user identification input is received and verified by the first client device as shown in step 416, the user identity verification is completed. Optionally, the user identity verification may be performed at a later stage, such as when an account is selected for transfer at block 312 below.

At block 308, device identity verification may be performed for the second client device using the identifier for the second client device. The device identity verification may be initiated by the first client device after completing the user identity verification. As shown at step 418 of FIG. 4, the first client device may send a challenge communication to the second client device, where the challenge communication includes at least the identifier for the second client device. In some implementations, the challenge communication may be a combined challenge communication showing a chain between the current challenge communication and a previous challenge communication. In this case, the chain may be between the challenge communications for the current device identity verification and the user identity verification performed at block 306. The combined challenge communication may therefore include the identifier for the second client device and information related to the user identity verification.

In response to receiving the challenge communication for the device identity verification, the second client device may insert a signature including an identifier related to the security status of the second client device. As described previously, the security status of the second client device may be retrieved from hardware of the second client device, such as a trusted security chip. The signature including the identifier is then transmitted in a validation request to the authentication server at step 420. In some implementations where the authentication server is part of the second client device 130, the transmission of the validation request with the signature including the identifier may be performed by invoking or citing the signature including the identifier to the authentication server.

After receiving the validation request, the authentication server verifies the second client device as a secure device using the identifier and the database of device identity information at step 422. As described above, the database of device identity information may be stored at the memory 114 of the authentication server 110, or at a storage system 150 accessible to the one or more processors 112 of the authentication server. The database of device identity information may include known identifiers for secure devices. When the identifier in the signature matches an identifier of a device stored in the database, the second client device is verified to be a secure device. In addition, the verification may also include checking that the identifier in the challenge communication matches the identifier in the signature to ensure that the validation is being performed for the intended client device. The verification may also include checking that the information related to the user identification verification is from the first client device.

The authentication server then transmits a response to the second client device with a confirmation of the verification (certification) and a transfer token for the secure credential transfer at step 424. The certification may be a signature including an identifier for the authentication server further inserted into the challenge communication. The transfer token may then be transmitted by the second client device to the first client device with challenge communication that has been updated with the certification at step 426.

At step 428, based on the updated challenge communication, the first client device may optionally perform an additional check of the certification of the second client device. The additional check may include (i) verifying that the signature of the second client device matches what is in the certification and (ii) verifying that the signature of the authentication server includes the identifier of a known authentication server. Performing the additional check may further improve the security and integrity of the device identity verification process.

At block 310, user input may be received at the first client device to select an account for the secure credential transfer (if the account is not already selected). The selected account may be the user profile on the first client device. A prompt for user input regarding the account selection may be provided by the first client device at step 430 of FIG. 4 after the transfer token is received at the first client device and/or after the additional check verifies the certification. The prompt may be provided on the display 122 of the first client device. This may improve security of the credential transfer process, since information indicative of a user account may not be provided to the second client device until confirmation is received that the second client device is trustworthy and is prepared for the secure credential transfer. The user input may be received at step 432, and may also include a request for a validity time for a regular session token for the account. The validity time may be, for example, 30 minutes. This can facilitate the temporary authentication of a user account or profile and associated settings. This temporary authentication may improve user security by preventing access by a third party at a subsequent time. Optionally, the user identity verification may be performed at this stage, either before or after the account is selected.

At block 312, a secure channel is established between the first client device and the second client device using one or more tokens generated by the authentication server. At step 434 of FIG. 4, the first client device may request a temporary token for the selected account from the authentication server. In response, the authentication server may transmit the temporary token to the first client device at step 436, and, when applicable, note the requested validity time for the regular session token. The temporary token may be valid for a relatively short duration of time, such as 10 seconds or 30 seconds. The temporary token validity time need only be long enough to perform establish the secure channel. Using NFC, the temporary token is transmitted from the first client device to the second client device at step 438 which then signs the temporary token. For example, the second client device may sign the temporary token with the identifier from the security chip. The signed temporary token and the transfer token is transmitted from the second client device to the authentication server at step 440 to verify a channel between the first client device and the second client device. When the signature/identifier, temporary token, and transfer token all match what is stored on the authentication server, the authentication server verifies the channel at step 442. The authentication server then provides a regular session token that has the requested validity time for the secure credential transfer to the second client device at step 444.

At block 314, the secure credential transfer of the user profile from the first client device to the second client device is completed using the regular session token. The regular session token is transmitted from the second client device to the first client device at step 446 of FIG. 4, which then authenticates the second client device using NFC as a trusted device for the requested validity time at step 448. During the span of the validity time, the second client device is granted access to the user profile through an application such as a browser. Alternatively, the first client transmits the user profile to the second client device after the first client receives the regular session token. In some other examples, such as when a validity time has not been specified by a user, another period of time may be utilized instead of the requested validity time. The period of time may be a preset period of time or may be defined as when the first client device is in a set proximity of the second client device.

In some alternative examples, a trusted platform module (TPM), security-related instruction codes built into central processing units, or trusted execution environment (TEE) solutions may provide the status of the second client device or the identifier for the signatures rather than a trusted security chip.

In another example, in situations where the second client device may not have a network connection that allows it to access the authentication server, the first client device may be utilized by the second client device as an internet gateway for communicating with the authentication server. To this end, the first client device may provide ephemeral wireless connection to the second client device, serves as a proxy by transmitting to/from the authentication server on behalf of the second client device, or by other known means.

Figure 5:
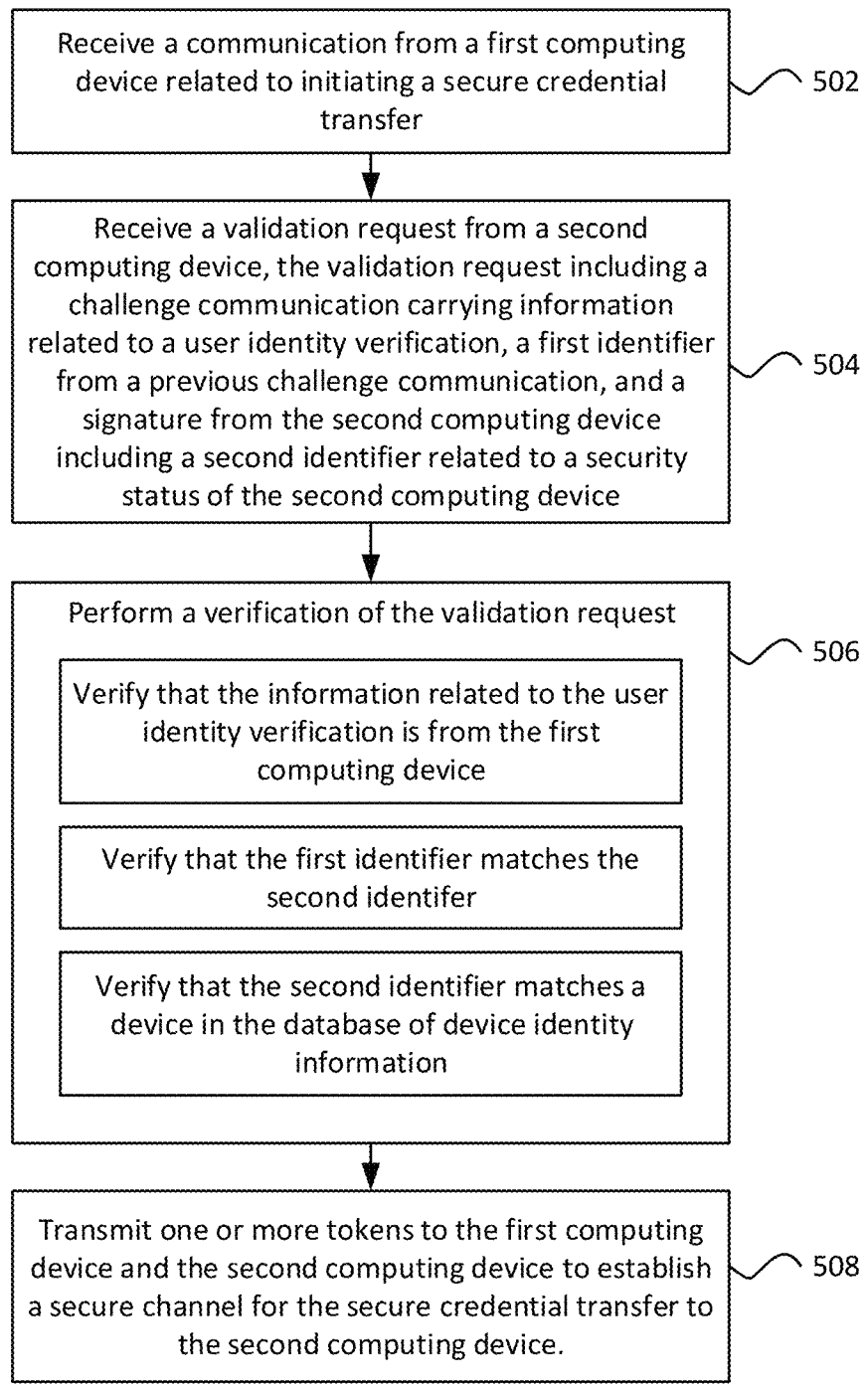
FIG. 5 is a flow diagram 500 of an example method in accordance with aspects of the disclosure.

FIG. 5 is a flow diagram 500 in accordance with aspects of the disclosure. More specifically, FIG. 5 shows a flow of an example method for authenticating a secure credential transfer from the first client device 120 to the second client device 130 performed by the one or more processors 112 of the authentication server 110.

At block 502, the one or more processors 112 may receive a communication from the first computing device related to initiating a secure credential transfer. As described in relation to steps 402 and 404a above, the communication may be triggered based on user input received at the first computing device, such as a tap in an applet open on the first computing device.

At block 504, a validation request may be received from a second computing device. The validation request may include a challenge communication carrying information related to a user identity verification, a first identifier from a previous challenge communication, and a signature from the second computing device including a second identifier related to a security status of the second computing device. The information related to the user identity verification may be obtained as described above in relation to steps 412-416. The first identifier may be obtained as described above in relation to steps 408, 410, and 418.

A block 506, the one or more processors 112 may perform a verification of the validation request. As shown in block 506 and further described in relation to step 422 above, the verification may include (i) verifying that the information related to the user identity verification is from the first computing device, (ii) verifying that the first identifier matches the second identifier, and (iii) verifying that the second identifier matches a device in the database of device identity information.

At block 508, one or more tokens may be transmitted by the one or more processors 112 to the first computing device and the second computing device to establish a secure channel for the secure credential transfer to the second computing device. In particular, the one or more processors 112 may generate a first token and transmit it to the second computing device including a certification for the validation request. As described above in relation to steps 424 and 426 above, the first token may be a transfer token. The one or more processors 112 may also generate a second token for a selected user account and transmit it to the first computing device. As described above in relation to steps 434 and 436, the second token may be a temporary token, which is requested by the first client device after receiving user input indicating a selection of a user account. Furthermore, the one or more processors 112 may generate a third token for establishing a secure channel for the secure credential transfer and transmit it to the second computing device. As described above in relation to steps 442 and 444, the third token may be generated and transmitted after the channel is verified based on the signed temporary token and the transfer token.

The features described above provide for a more secure process to authorize access to user credentials on a client device. By using a client device that is already trusted by a user to authenticate a second client device, the process requires less complicated user input and may improve security by removing the need for user credentials to be entered manually on an unknown device. Rather than requiring user input of login information and additional user verification steps, the authentication method requires user request of the transfer of a particular account and authentication at the trusted device. Also, because the process verifies the second device as a trustworthy device using an authentication server, the user may have greater confidence in the security of transferring or accessing the user credentials to the second device. Security may also be improved by the process of mutual identity verification of both the first and second client devices prior to any transfer of user credentials.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

In situations in which the systems discussed here may collect personal information about users, or may make use of personal information, users are provided with one or more opportunities to control whether programs or features collect user information (e.g., passwords, information about a user's social network, user characteristics (age, gender, profession, etc.), social actions or activities, user's preferences, content created or submitted by a user, or a user's current location). In addition, certain data may be treated in one or more ways before it is stored or used, so that personally identifiable information is removed. For example, a user's identity may be treated so that no personally identifiable information can be determined for the user, or a user's geographic location may be generalized in situations where location information is obtained (such as to a city, ZIP code, or state level), so that a particular location of a user cannot be determined. Thus, a user has control over how information is collected about the user and used by the embodiments described herein.

The invention claimed is:

1. A method, comprising:
   receiving, by one or more processors of a first client device, input from a user associated with the first client device to initiate a process of authenticating a second client device, wherein the input from the user provides an indication of a user account for a secure credential transfer;
   verifying, by the one or more processors, an identity of the user associated with the first client device; and
   in response to verifying the identity of the user associated with the first client device and upon verifying an identity of the second client device, initiating, by the one or more processors, a session for a period of time during which the second client device is granted access to the user account.

2. The method of claim 1, wherein the period of time corresponds to a validity time for the secure credential transfer.

3. The method of claim 2, wherein the input received from the user associated with the first client device includes the validity time.

4. The method of claim 2, further comprising using, by the first client device, the input received from the user associated with the first client device to select the user account.

5. The method of claim 4, wherein the user account is associated with a user profile.

6. The method of claim 5, wherein the user profile includes one or more of a device setting, an application download, an application setting, or an account setting.

7. The method of claim 1, further comprising: in response to receiving the input from the user associated with the first client device, transmitting, by the one or more processors to the second client device, instructions for initiating the secure credential transfer on the second client device.

8. The method of claim 7, further comprising: in response to the instructions for initiating the secure credential transfer on the second client device, receiving, by the one or more processors from the second client device, an identifier for the second client device.

9. The method of claim 8, further comprising: verifying, by the one or more processors according to the received identifier, an identity of the second client device.

10. The method of claim 1, further comprising: in response to receiving the input from the user associated with the first client device, transmitting, by the one or more processors to an authentication server, information related to at least one of the first client device or the user account.

11. The method of claim 1, wherein the period of time is defined as when the first client device is in a set proximity of the second client device.

12. A first client device comprising:
a user input device; and
one or more processors in communication with the user input device, the one or more processors being configured to:
receive, via the user input device, input from a user associated with the first client device to initiate a process of authenticating a second client device, wherein the input from the user provides an indication of a user account for a secure credential transfer;
verify an identity of the user associated with the first client device; and
in response to the verification of the identity of the user associated with the first client device and upon verifying an identity of the second client device, initiate a session for a period of time during which the second client device is granted access to the user account.

13. The first client device of claim 12, wherein the period of time corresponds to a validity time for the secure credential transfer.

14. The first client device of claim 13, wherein the input received from the user associated with the first client device includes the validity time.

15. The first client device of claim 13, wherein the first client device is configured to select the user account based on the input received from the user associated with the first client device.

16. The first client device of claim 15, wherein the user account is associated with a user profile.

17. The first client device of claim 16, wherein the user profile includes one or more of a device setting, an application download, an application setting, or an account setting.

18. The first client device of claim 12, wherein the one or more processors are further configured to: in response to receiving the input from the user associated with the first client device, transmit, to the second client device, instructions for initiating the secure credential transfer on the second client device.

19. The first client device of claim 18, wherein the one or more processors are further configured to: in response to the instructions for initiating the secure credential transfer on the second client device, receive, from the second client device, an identifier for the second client device.

20. The first client device of claim 19, wherein the one or more processors are further configured to: verify, according to the received identifier, an identity of the second client device.

21. The first client device of claim 12, wherein the one or more processors are further configured to: in response to receiving the input from the user associated with the first client device, transmitting, to an authentication server, information related to at least one of: the first client device or the user account.

22. The first client device of claim 12, further comprising memory configured to store device identity information for a plurality of devices.

23. The first client device of claim 22, wherein the second client device is identified by the device identity information.

* * * * *